United States Patent
Malinovskiy et al.

(10) Patent No.: US 11,275,153 B2
(45) Date of Patent: Mar. 15, 2022

(54) METHOD FOR FMCW-BASED DISTANCE MEASUREMENT IN WAVEGUIDES

(71) Applicant: Endress+Hauser SE+Co. KG, Maulburg (DE)

(72) Inventors: Alexey Malinovskiy, Maulburg (DE); Harald Faber, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 286 days.

(21) Appl. No.: 16/360,150

(22) Filed: Mar. 21, 2019

(65) Prior Publication Data
US 2019/0293757 A1 Sep. 26, 2019

(30) Foreign Application Priority Data

Mar. 21, 2018 (DE) .................. 10 2018 106 724.0

(51) Int. Cl.
*G01S 7/40* (2006.01)
*G01S 13/58* (2006.01)
(Continued)

(52) U.S. Cl.
CPC ............ *G01S 7/4056* (2013.01); *G01F 23/28* (2013.01); *G01F 23/284* (2013.01); *G01S 13/34* (2013.01);
(Continued)

(58) Field of Classification Search
CPC ........ G01S 7/4056; G01S 13/34; G01S 13/88; G01S 13/347; G01F 23/28; G01F 23/284
See application file for complete search history.

(56) References Cited

U.S. PATENT DOCUMENTS

| 10,018,708 B2* | 7/2018 | Lagler | G01S 7/4008 |
| 2011/0166805 A1* | 7/2011 | Hammer | G01F 23/284 |
| | | | 702/55 |

(Continued)

FOREIGN PATENT DOCUMENTS

| DE | 102008050117 A1 | 4/2010 |
| WO | 2016202531 A1 | 12/2016 |

OTHER PUBLICATIONS

Search Report for German Patent Application No. 10 2018 106 724.0, German Patent Office, dated Oct. 10, 2018, 6 pp.

(Continued)

*Primary Examiner* — Thomas M Hammond, III
(74) *Attorney, Agent, or Firm* — Christopher R. Powers; Endress+Hauser (USA) Holding Inc.

(57) ABSTRACT

The present disclosure relates to a method for FMCW-based measurement of a distance of an object located in a waveguide, as well as a corresponding distance measurement device that, in particular, may be used for fill-level measurement in surge pipes or bypass pipes of containers. The method is based upon the fact that the transmission signal that is typical in FMCW is not ramp-like, and thus is emitted with constant frequency modulation. Rather, according to the present disclosure, a curvature of the frequency ramp is set to be at least approximately proportional to the frequency dependency of the propagation velocity of the transmission signal in the waveguide. The distortion effect is thus compensated for in that the propagation velocity of the transmission signal in waveguides is not constant, but, rather, decreases with falling transmission frequency.

7 Claims, 5 Drawing Sheets

(51) Int. Cl.
*G01F 23/28* (2006.01)
*G01S 13/34* (2006.01)
*G01S 13/88* (2006.01)
*G01F 23/284* (2006.01)

(52) U.S. Cl.
CPC .......... *G01S 13/347* (2013.01); *G01S 13/584* (2013.01); *G01S 13/88* (2013.01)

(56) References Cited

U.S. PATENT DOCUMENTS

| | | | |
|---|---|---|---|
| 2013/0207835 A1* | 8/2013 | Deilmann | G01F 23/284 342/124 |
| 2015/0233750 A1* | 8/2015 | Malinovskiy | G01S 7/354 342/124 |
| 2016/0202347 A1* | 7/2016 | Malinovskiy | G01S 7/352 342/124 |
| 2016/0363648 A1* | 12/2016 | Mindell | G01S 13/885 |
| 2018/0239010 A1* | 8/2018 | Mindell | G01S 13/82 |
| 2019/0107424 A1* | 4/2019 | Welle | H01P 5/08 |

OTHER PUBLICATIONS

Vogt, et al., An Optimized Radar System For Tank Level Measurement In Dispersive Bypass Pipes, GeMiC 2015, Mar. 16-18, 2015, pp. 178-181.
Devine, Peter, Radar level measurement—The user's guide, VEGA Controls Ltd., 2000, 154 pp.

* cited by examiner

METHOD FOR FMCW-BASED DISTANCE MEASUREMENT IN WAVEGUIDES

CROSS-REFERENCE TO RELATED APPLICATION

The present application is related to and claims the priority benefit of German Patent Application No. 10 2018 106 724.0, filed on Mar. 21, 2018, the entire contents of which are incorporated herein by reference.

TECHNICAL FIELD

The present disclosure relates to a method for FMCW-based measurement of a distance d of an object located in a waveguide, as well as a corresponding distance measurement device—in particular, for fill-level measurement.

BACKGROUND

In automation technology—in particular, in process automation technology—field devices serving to detect and/or modify process variables are frequently used. In order to detect process variables, sensors are used which are, for example, used in fill-level measuring devices, flow-rate measuring devices, pressure and temperature measuring devices, pH redox potential measuring devices, conductivity measuring devices, etc. They detect the respective process variables, such as the fill-level, flow rate, pressure, temperature, pH value, redox potential, or conductivity. A variety of such field devices is manufactured and marketed by the Endress+Hauser company.

For fill-level measurement of bulk materials in containers, contactless measurement methods have been established, since they are robust and low-maintenance. Within the scope of the present disclosure, also understood under the term, "containers," are unenclosed receptacles—for example, pools, lakes, or flowing bodies of water. Another advantage consists in the capability of measuring the fill-level virtually continuously, and thus with a very high resolution. In the field of continuous fill-level measurement, predominantly radar-based measuring methods are used. The FMCW ("frequency modulated continuous wave") method thereby forms an established measurement principle.

The measurement principle of FMCW-based radar distance measurement methods is based upon emitting an electromagnetic transmission signal in the microwave range and receiving the correspondingly reflected signal after reflection on the bulk-good surface (or on the object whose distance is to be determined), in order to determine from this the signal propagation delay. With knowledge of the signal velocity, i.e., the speed of light, the distance can be calculated from the signal propagation delay.

To determine the propagation delay, in the FMCW method, the transmission signal is emitted, not with a temporally-constant frequency, but, rather, within a pre-defined frequency band with a temporally-constant frequency modulation. The temporally-constant frequency modulation here normally has a sawtooth shape, but a triangular modulation is also possible. Based upon the speed of light and the constant frequency modulation, it is possible to determine the signal propagation delay via measurement of the frequency difference between the currently received, reflected signal and the presently emitted transmission signal, since the frequency difference (without the influence of possible disturbance variables) changes in proportion to the distance of the object. The functional principle of the FMCW-based fill-level measurement method is described in the international disclosure document, WO 2016202531 A1, for example.

Particularly at higher frequencies, the radiation cone with which the transmission signal is emitted (and, analogous to this, the reception cone of the antenna with which the reflected signal is received) is increasingly narrower. The danger thereby increases that, for instance with moving objects, e.g., undulating surfaces of liquid bulk materials, the reflected signal arrives outside of the reception cone of the antenna, and thus no distance or fill-level can be determined.

With liquid bulk materials, one possibility for reducing influences due to undulating bulk material surfaces is the use of a surge pipe or bypass pipe. In the case of surge pipes, these are attached approximately vertically within the container. The pipe is thereby structurally ventilated, so that the fill-level of the bulk material within the pipe coincides with the fill-level in the remainder of the container. With bypass pipes, these are attached next to the container, wherein, in this instance, the pipes are also hydrostatically connected to the process chamber so that the fill-level in the bypass pipe is, in turn, identical to the fill-level in the container. A possible wave formation of the bulk material is at least markedly reduced within the pipe.

Given use of a surge pipe or bypass pipe, the fill-level measurement device is not—as is otherwise typical—arranged such that the antenna of the fill-level measurement device radiates directly into the container in which the bulk material is located. Rather, the fill-level measurement device is attached at the upper end of the surge pipe so that the antenna of said fill-level measurement device emits the transmission signal within the surge pipe in the direction of the bulk material.

In contrast to freely-radiating distance measurement devices, with radiation in the pipe, the propagation velocity of the transmission signal is not the speed of light co (in vacuum or in air); rather, it is reduced. The effective propagation velocity corresponds to the group velocity $c_G$ of the excited waveguide mode according to the formula, $$c_G(f) = c_0 * \frac{\sqrt{\left(\frac{f}{f_c}\right)^2 - 1}}{f/f_c},$$

where $f_c$ is what is known as the cut-off frequency, which is dependent upon the internal pipe diameter and the mode; f is the frequency of the transmission signal.

Due to this effect, which is known as the dispersion effect, given distance measurement (or fill-level measurement) in waveguides such as pipes, the determined distance is distorted or inaccurate, since a constant propagation velocity is not present for calculation of the distance from the propagation delay. For example, this effect is described in the conference publication, "*An Optimized Radar System for Tank Level Measurement in Dispersive Bypass Pipes*" (M. Vogt; GeMiC; Mar. 16-18, 2015; Nuremberg). Furthermore, for fill-level measurement in pipes, it is there proposed, as an improvement, to subsequently correct the dispersion-plagued difference frequencies using the above formula. However, in practice, this is possible only to a limited extent, since such a method must be performed iteratively for every single distance and is therefore very computationally intensive.

SUMMARY

The present disclosure is therefore based upon the aim of providing a method with which a distance measurement of objects in waveguides may be performed with more certainty and accuracy.

The present disclosure achieves this aim via a method for FMCW-based measurement of a distance of an object located in a waveguide. It includes the following method steps: emitting a transmission signal along the waveguide in the direction of the object, wherein the transmission signal is emitted within a predetermined frequency band with a temporally-defined frequency modulation; receiving the reflected signal after reflection at an object; and determining the distance using a difference frequency between the reflected signal and the transmission signal.

According to the present disclosure, the method includes that the dispersion-dependent distortions in the difference signal are prevented via a precisely-adapted transmission signal with curved frequency ramp. The degree of curvature, i.e., the frequency dependency of the temporal frequency modulation, is thereby set to be at least approximatively proportional to the frequency dependency of the propagation velocity ($c_G(f)$) of the transmission signal (corresponding to the aforementioned formula) in the waveguide. With FMCW-based measurement in waveguides or pipes, it results from this that the difference frequency between the reflected signal and the transmission signal, and thus the distance, can be determined markedly more precisely, even without subsequent signal processing.

A voltage-controlled oscillator may generate the time curve of the transmission signal, in that a corresponding, temporally-variable control voltage is applied. The voltage curve or frequency curve can thereby be reproduced with arbitrary precision—for example, via polynomial approximation.

A, technically, comparably simple possibility for adaptation of the frequency dependencies consists in approximating the frequency dependency of the frequency modulation to the frequency dependency linearly, at least in part, at the propagation velocity ($cG(f)$). In this instance, the frequency dependency of the frequency modulation may, for example, be approximated to the frequency dependency at the propagation velocity ($cG(f)$), in that: the frequency band is sub-divided into at least two sub-bands that are, in particular, of equal size; the center frequency of each sub-band is determined; and a respective linear frequency modulation of the temporal frequency modulation is set within the sub-bands, wherein the constant frequency modulations are set using a common proportionality factor that is proportional to the respective propagation velocity ($cG(f)$) at the corresponding center frequency.

In order to achieve a further improved approximation, the frequency band may be subdivided into more than two sub-bands.

The previously described method according to the present disclosure may, accordingly, be implemented in a distance measurement device for FMCW-based measurement of a distance of an object located in a waveguide. For this, the distance measurement device has to comprise the following components: a high-frequency generation unit for generating an electrical high-frequency signal that, within the predetermined frequency band, exhibits the temporally-defined frequency modulation; a signal splitter for splitting the electrical high-frequency signal; at least one transmission/reception antenna for emitting the high-frequency signal as a transmission signal and/or for receiving the reception signal; a mixer for mixing the electrical high-frequency signal with the obtained reception signal; and an evaluation unit for determining the distance using the difference frequency of the mixed signal.

It is thereby beneficial, in particular, to use the distance measurement device as a fill-level measurement device that serves for measurement of the fill-level of a bulk material located in a container, which fill-level is in a bypass pipe or surge pipe of said container.

BRIEF DESCRIPTION OF THE DRAWINGS

The present disclosure is explained in more detail with reference to the following figures. Shown are.

DETAILED DESCRIPTION

Figure 1:
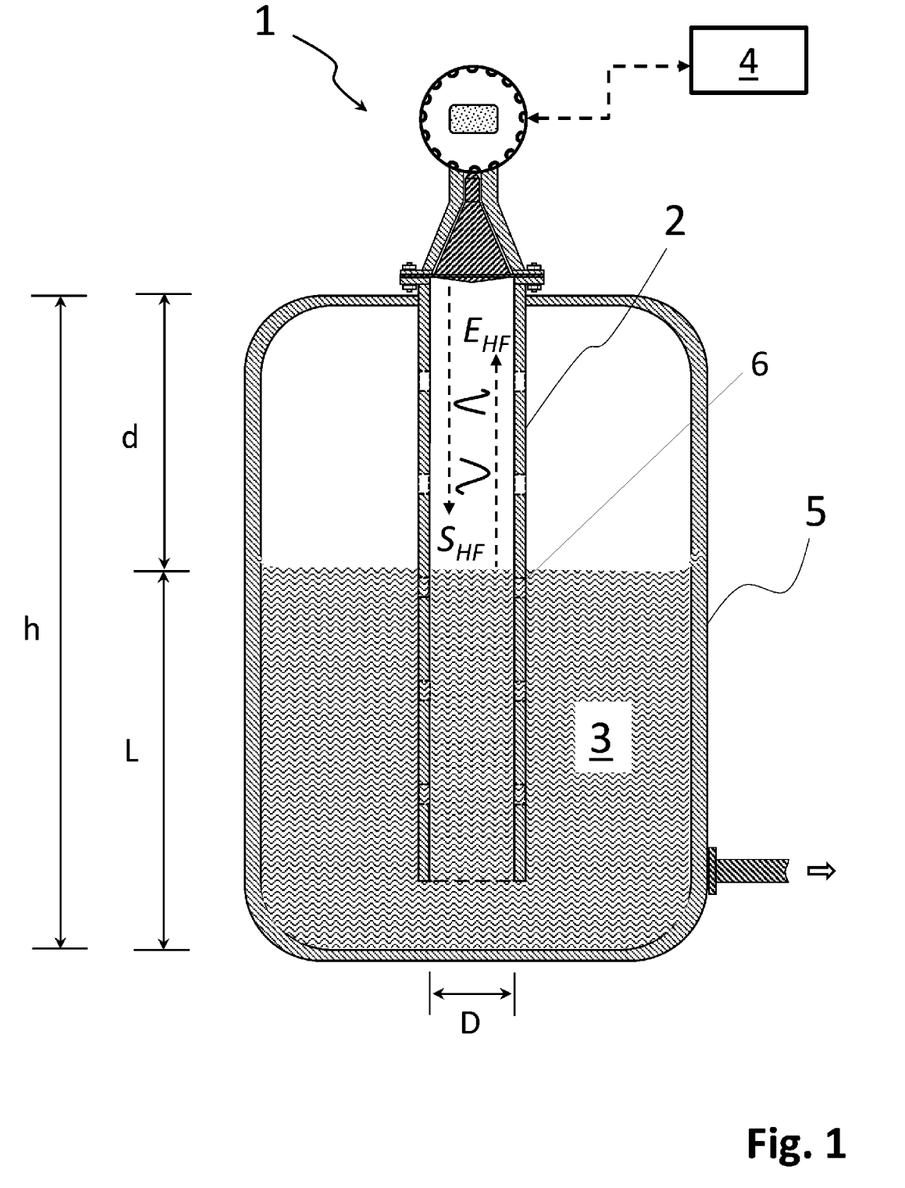
FIG. 1 shows a fill-level measurement device at a surge pipe of a container.

FIG. 1 shows a conventional arrangement of a fill-level measurement device 1 operating according to the FMCW principle at a surge pipe 2, which surge pipe 2 is arranged approximately vertically in a container 5. The surge pipe 2 normally has a standardized internal diameter D—for example, DN 100 according to the EN 10255 standard. Located in the container 5 is a fluid bulk material 3 whose fill-level L is to be determined by the fill-level measurement device 1. The fill-level measurement device 1 is mounted at the surge pipe 2 at a previously known installation height h, above the bulk material 3. Via measurement of the distance d from the surface of the bulk material 3, with knowledge of the installation height h, the fill-level L=h−d may be calculated by the fill-level measurement device 1. Depending upon the application, the container 5 may be more than 30 m high.

The fill-level measurement device 1 is thus mounted at the upper end of the surge pipe 2 so that, to measure the distance d, it emits a microwave-based transmission signal $S_{HF}$ inside the surge pipe 2 in the direction of the bulk material 3 and, after reflection at the surface of said bulk material 3, receives the correspondingly reflected signal $E_{HF}$. So that the bulk material 3 inside the pipe has a fill-level L that is identical to the remainder of the container 5, the surge pipe 2 has lateral compensation openings 6 that are distributed over the length of the pipe 2.

As an alternative to a mounting of the pipe 2 within the container 5, an additional variant (not shown) consists in using a bypass pipe, mounted next to the container 5, for fill-level measurement, in that the fill-level measurement device 1 is mounted at the bypass pipe in a manner analogous to the surge pipe 2. In such a case, the bypass pipe is also hydrostatically connected to container 5, so that the same fill-level L as in the container 5 prevails in the bypass pipe.

The fill-level measurement device 1 is normally connected to a superordinate unit 4, e.g., a process control system, via a bus system, for instance, "PROFIBUS," "HART," or "WirelessHART." For one, information about the operating state of the fill-level measurement device 1 may be communicated via said bus system. Information about the fill-level L may also be communicated, in order to control possible inflows or outflows.

Figure 2:
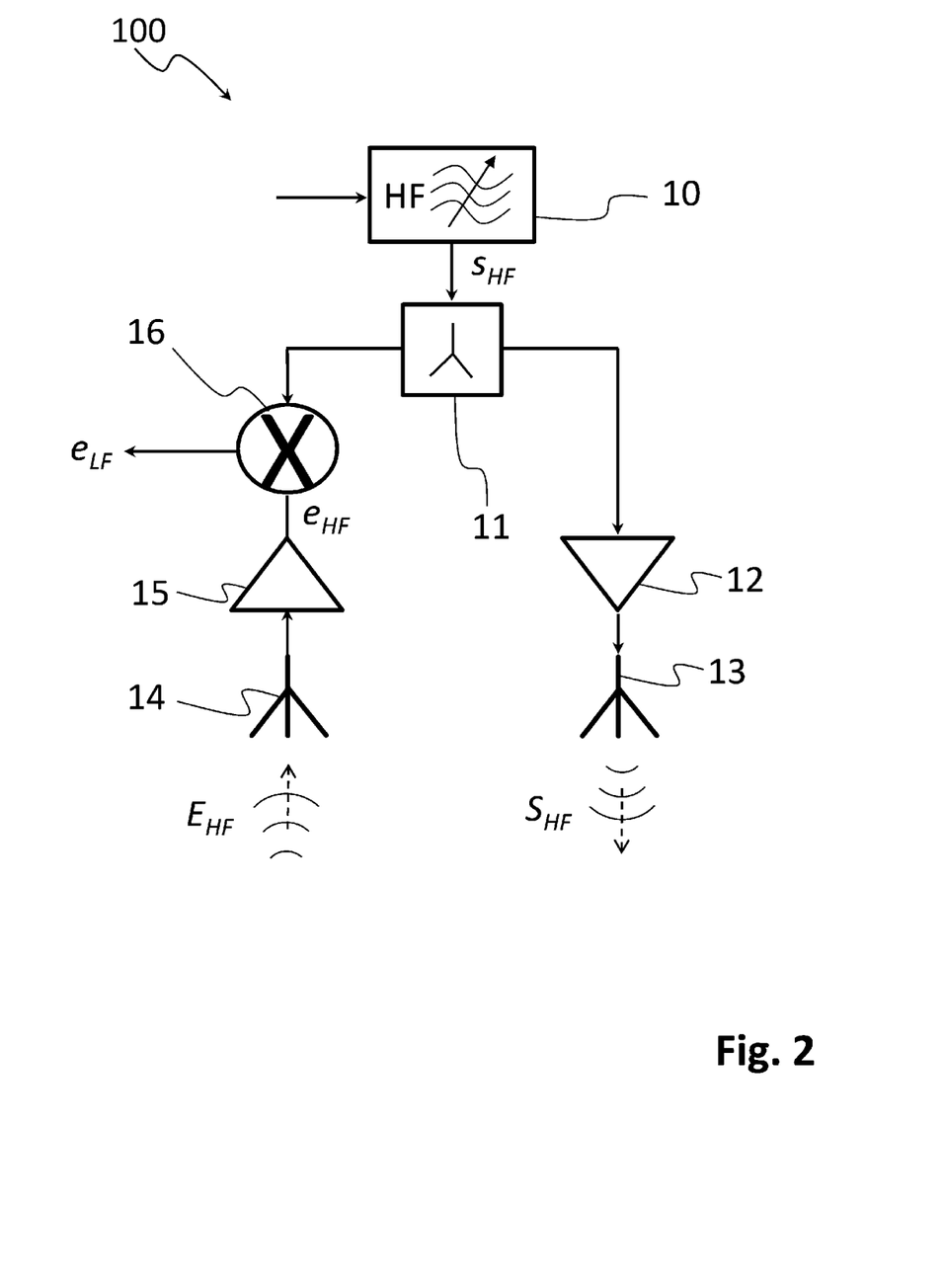
FIG. 2 shows a principle schematic of an FMCW-based distance measurement device.

A schematic of a fill-level measurement device 100 operating according to the FMCW method (or of a FMCW-based distance measurement device in general) is presented in FIG. 2. The core of the present disclosure is a high-frequency signal generation unit 10 for generation of an electrical high-frequency signal $s_{HF}$. The frequency of the high-frequency signal $s_{HF}$ defines the frequency of the transmission signal $S_{HF}$, which is within the microwave range. Therefore, the high-frequency signal generation unit 10 is configured as to generate the electrical high-frequency signal $s_{HF}$ with the ramp-like, i.e., constant, frequency modulation df/dt that is required in FMCW.

Figure 3:
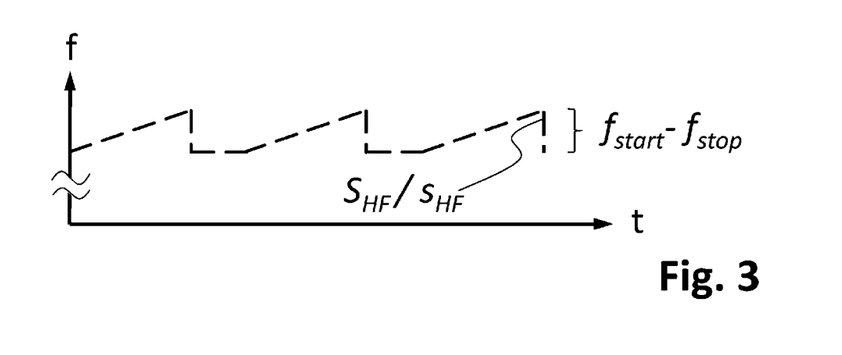
FIG. 3 shows a sawtooth-shaped frequency modulation of the FMCW method.

Such a ramp-like frequency modulation according to the prior art is depicted in FIG. 3. In the diagram shown in FIG. 3, the frequency of the electrical high-frequency signal $s_{HF}$ or of the transmission signal $S_{HF}$ is plotted against time t. The frequency accordingly changes periodically, repeating within a predefined frequency band $f_{start}$-$f_{stop}$, with a constant modulation rate df/dt=const. The periodicity of the individual frequency ramps may thereby be within a range of a few 100 ms. The duration of the individual ramp may be in a range between 100 μs and 100 ms. The position of the frequency bands ($f_{start}$-$f_{stop}$) be set with consideration of is to regulatory requirements, which is why the ISM bands at 6 GHz, 26 GHz, or 80 GHz are preferably implemented as a frequency band $f_{start}$-$f_{stop}$. Depending upon the position of the frequency band $f_{start}$-$f_{stop}$, the bandwidth $f_{start}$-$f_{stop}$ is, in particular, between 0.5 GHz and 10 GHz.

For emitting the transmission signal $S_{HF}$, according to FIG. 2, the electrical high-frequency signal $s_{HF}$ is supplied, via a signal splitter 11 (and, possibly, an output amplifier 12), to a transmission antenna 13. The transmission antenna 13 may be realized as a horn antenna or planar antenna (e.g., as a patch antenna or fractal antenna), for example.

Via the reflection of the transmission signal $S_{HF}$ at the object whose distance d is to be determined (in fill-level measurement, the surface of the bulk material 3), a correspondingly reflected echo signal $E_{HF}$ is received at a reception antenna 14 of the transmission/reception unit 2. Analogously to the transmission antenna 13, the reception antenna 14 may thereby likewise be realized as a planar antenna. Also conceivable is the use of a combined transmission/reception antenna that is, accordingly, in contact with the signal splitter 11 via a transmission/reception diplexer.

After reception, in the reception antenna 14, the echo signal $E_{HF}$ is converted back into a purely electrical signal $e_{HF}$ (which may, in turn, optionally be amplified by a reception amplifier 15). This is subsequently mixed with the high-frequency signal $s_{HF}$ of the high-frequency signal generation unit by means of a receiving mixer 16, wherein, for this, the high-frequency signal $s_{HF}$ is branched off from the signal splitter 11. An intermediate frequency signal $e_{LF}$ that is typical in an FMCW method is thereby generated that forms the basis for the determination of the distance d. According to the FMCW principle, the frequency of the intermediate frequency signal $e_{LF}$ is thereby proportional to the distance d of the object, such that a suitable evaluation unit (e.g., within the measurement device 100 or superordinate unit 4) may determine the distance d via a measurement of the frequency of the intermediate frequency signal $e_{LF}$. To determine the frequency of the intermediate frequency signal $e_{LF}$, this may be subjected to a (fast) Fourier transformation, for example.

Figure 4:
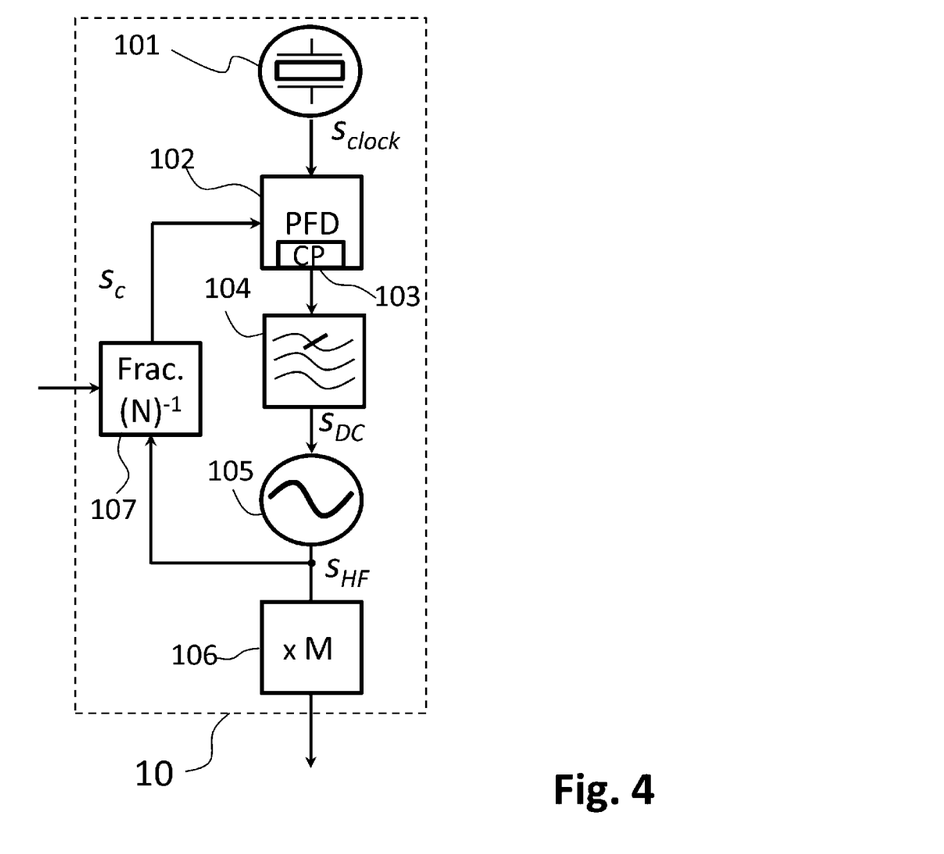
FIG. 4 shows a block diagram of a high-frequency generation unit of the distance measurement device.

To understand how the ramp-like, electrical high-frequency signal $s_{HF}$ is generated by the high-frequency generation unit 10, in FIG. 4, a standard embodiment variant implemented according to the prior art is presented. The functional principle of the high-frequency generation unit 10 shown there is known by the term, "phase locked loop" (PLL). The high-frequency generation unit 10 is respectively based upon a controllable, electrical high-frequency oscillator 105 (realized according to the prior art as a VCO) that generates the electrical high-frequency signal $s_{HF}$. Corresponding to the application in FMCW radar, the frequency of the high-frequency signal $s_{HF}$ is in the GHz range, from 1 GHz up to more than 100 GHz.

In the shown high-frequency generation unit 10, the frequency of the high-frequency signal $s_{HF}$ is regulated via feedback, and thus is, on the one hand, stabilized against fluctuations of the ambient temperature; on the other hand, the sawtooth-shaped frequency modulation df/dt is here set. The feedback is realized in that a control signal $s_c$ is branched off the high-frequency signal $s_{HF}$ of the high-frequency oscillator 105 and supplied to a phase comparator 102. The phase comparator 102 compares the current phase shift of the control signal $s_c$ with a reference signal $s_{clock}$ of constant frequency. The reference signal $s_{clock}$ here has an exactly pre-adjustable reference frequency, with negligible temperature drift.

For example, a quartz oscillator may be used as a source of the reference signal $s_{clock}$, which quartz oscillator typically generates the reference signal $s_{clock}$ with a frequency in a range between 10 MHz and 100 MHz.

Depending upon the phase difference between the control signal $s_c$ and the reference signal $s_{clock}$, the phase comparator 102 generates a control signal $s_{DC}$ which is supplied to a corresponding control input of the high-frequency oscillator 105.

Given use of a VCO as a high-frequency oscillator 105, this requires a direct voltage for controlling the frequency of the high-frequency signal $s_{HF}$. Therefore, a charge pump 103 is connected downstream of the digital phase comparator 105 in the embodiment variant shown in FIG. 4. A corresponding digital/analog transformation of the control signal six is thus performed by the charge pump 103. Depending upon the conversion of the high-frequency signal generation unit 10, it is, possibly, additionally necessary to implement a level adaptation by means of a level converter (not shown), before or after the charge pump 103. The control signal six may additionally have interference components—in particular, high-frequency interference components—corrected by means of a filter 104 that is arranged between the phase comparator 102 and the high-frequency oscillator 105. The filter 104 in FIG. 4 is accordingly designed as a low-pass filter.

In the control loop of the high-frequency generation unit 10 as depicted in FIG. 4, the ramp-like frequency modulation df/dt of the high-frequency signal $s_{HF}$, which is typical with FMCW radar, is set at the frequency divider 107. For this, a frequency divider 107, known as a "fractional-N divider" according to the prior art, is controlled so that its division factor N is temporally constant, and thus, in effect, varies in a ramp shape. With fractional-N dividers, the smallest resolvable frequency resolution depends upon the word width N; it is 20-32 bit.

Figure 5:
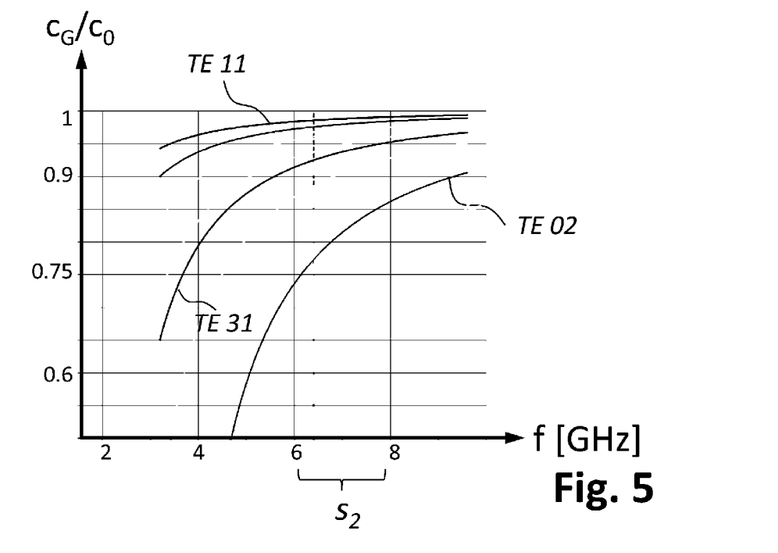
FIG. 5 shows the frequency dependency of the transmission signal in the waveguides.

A ramp-like frequency modulation df/dt of the transmission signal $S_{HF}$ leads to correct measurement results, insofar as its propagation velocity is constant. In principle, this is the case, as long as the nearly constant speed of light can be used as a basis for the propagation velocity. This is the case with free radiation of the transmission signal $S_{HF}$. However, this is no longer the case for radiation in a waveguide such as a pipe, for example. There, the effective propagation velocity $c_G$ is reduced according to the formula, $$c_G(f) = c_0 * \frac{\sqrt{\left(\frac{f}{f_c}\right)^2 - 1}}{f/f_c}$$

with decreasing frequency. This relationship is presented in FIG. 5 for various modes (TE 11, TE 31, TE 02) of the transmission signal $S_{HF}$. That limit frequency $f_c$ at which the propagation velocity $c_G$ converges at low frequencies (not explicitly shown in FIG. 5) is referred to as a "cut-off frequency." As is apparent from FIG. 5, it is dependent upon the respective prevailing mode of the transmission signal $S_{HF}$ (and upon the diameter D of the waveguide).

According to the present disclosure, a distortion of the distance measurement is counteracted in that the frequency modulation df/dt of the electrical high-frequency signal $s_{HF}$ or of the transmission signal $S_{HF}$ is not constant; rather, the frequency dependency of the temporal frequency modulation (df/dt) is set to be as proportional as possible to the frequency dependency of the propagation velocity ($c_G(f)$) of the transmission signal ($S_{HF}$) in the waveguide 2:

$$\frac{df}{dt} \sim c_G(f)$$

Figure 6:
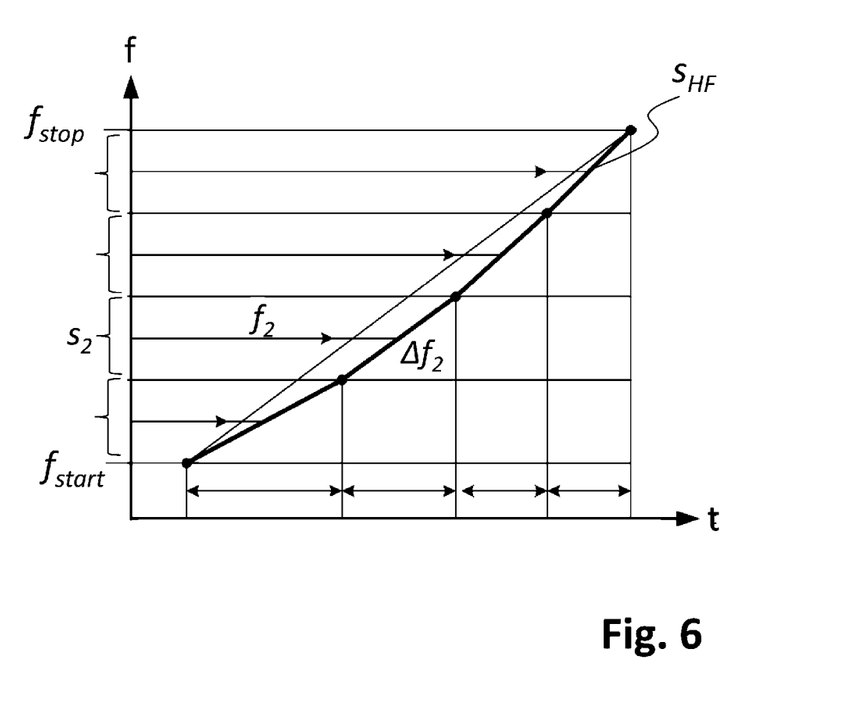
FIG. 6 shows an approximation of the frequency modulation, according to the present disclosure, to the frequency dependency of the transmission signal.

With the high-frequency generation unit 10 depicted in FIG. 4, this idea can be implemented by corresponding control of the fractional-N divider 107, for example. Depending upon the type of fractional-N divider 107 that is used, such a proportionality may be at least approximately established in that the frequency dependency of the frequency modulation df/dt is linearly approximated to the frequency dependency of the propagation velocity $c_G(f)$. This is illustrated in FIG. 6.

There, the frequency band $f_{start}$-$f_{stop}$ is subdivided into four, equally large sub-bands $s_1$, $s_2$, $s_3$, $s_4$, wherein, accordingly, the center frequency $f_1$, $f_2$, $f_3$, $f_4$ of each sub-band $s_1$, $s_2$, $s_3$, $s_4$ is known. Corresponding to this, the high-frequency generation unit 10 is set so that the electrical high-frequency signal $s_{HF}$ respectively has a linear frequency modulation $\Delta f_1$, $\Delta f_2$, $\Delta f_3$, $\Delta f_4$ within the sub-bands $s_1$, $s_2$, $s_3$, $s_4$. The linear frequency modulations $\Delta f_1$, $\Delta f_2$, $\Delta f_3$, $\Delta f_4$ are thereby set using a common proportionality factor proportional to the respective propagation velocity $c_G(f_{1,\,2,\,3,\,4})$ at the corresponding center frequency $f_1$, $f_2$, $f_3$, $f_4$.

An ideal linear approximation of the frequency modulation df/dt to the propagation velocity with regard to its frequency dependencies would involve subdividing the frequency band $f_{start}$-$f_{stop}$ into infinitely many sub-bands $s_1$, $s_2$, $s_3$, $s_4$. For the purpose of improved approximation, it is therefore within the sense of the present disclosure to maximize the number of sub-bands $s_1$, $s_2$, $s_3$, $s_4$ to the greatest extent technically possible. The control of the fractional-N dividers 105 in seven sub-bands $s_1$, . . . , $s_7$ is already technically feasible. As an alternative to the depiction in FIG. 4, it would, naturally, additionally be conceivable to dimension the sub-bands $s_1$, $s_2$, $s_3$, $s_4$ in different sizes, in order, for example, to, in turn, achieve an improved approximation.

Figure 7:
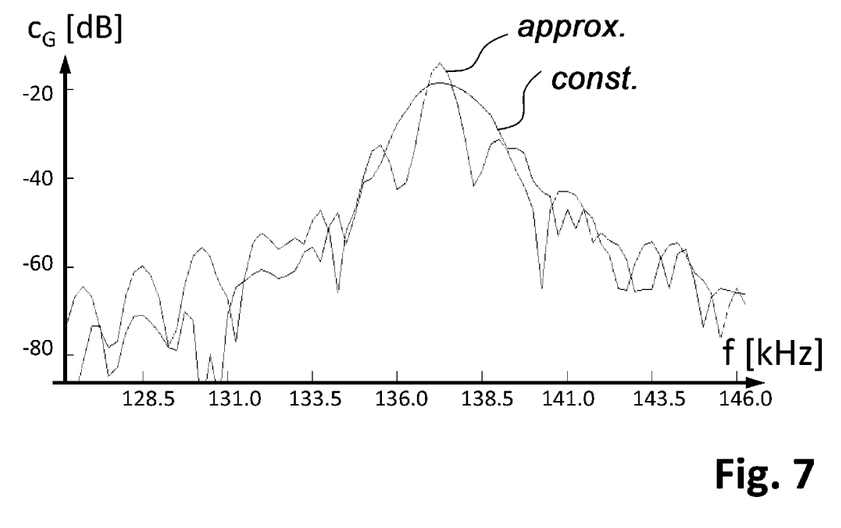
FIG. 7 shows a comparison of the frequency spectra between constant frequency modulation and frequency modulation according to the present disclosure.

FIG. 7 illustrates the effect that results due to the curvature, according to the present disclosure, of the frequency ramp of the transmission signal $S_{HF}$ (linearly approximated with seven sub-bands $s_1$, . . . , $s_7$) in comparison to constant, ramp-like excitation (constant frequency modulation df/dt). With logarithmic presentation of the amplitudes, it shows a section of the frequency spectrum of the two, associated, intermediate frequency signals $e_{LF}$, in the case of measurement of the previously-known distance d (e.g., 30 m) of an object in a DN150 surge pipe. The antenna that is used thereby predominantly excites the desired TE 01 mode. The propagation velocity $c_G(f)$ of this mode is, accordingly, used for approximation. The two measurement curves clarify that the frequency maximum (at approximately 137 kHz), corresponding to the object or its distance d, on the one hand, markedly increases the sharpness of the maximum in the case of the approximation according to the present disclosure. On the other hand, the maximum exhibits a greater amplitude. According to the present disclosure, the distance d may thus be determined more precisely, and also with greater certainty, on the basis of the intermediate frequency signal $e_{LF}$.

The invention claimed is:

1. A method for FMCW-based measurement of a distance of an object located in a waveguide, the method comprising:
    emitting a transmission signal along the waveguide in the direction of the object, wherein the transmission signal is emitted within a predetermined frequency band with a temporally-defined frequency modulation;
    receiving the reflected signal after reflection at an object; and
    determining the distance using a difference frequency between the reflected signal and the transmission signal,
    wherein the temporal frequency modulation of the transmission signal is proportionally approximated to a hyperbolic frequency dependency of a propagation velocity of the transmission signal in the waveguide,
    wherein a frequency dependency of the temporal frequency modulation is linearly approximated to the hyperbolic frequency dependency of the propagation velocity such that:
    the frequency band is subdivided into at least two sub-bands of equal size;
    a center frequency of each sub-band is determined; and
    a respective linear frequency modulation is set within each sub-band as a sub-band temporal frequency modulation, wherein the respective linear frequency modulations are set using a proportionality factor for each sub-band, the proportionality factor being proportional to the respective propagation velocity at the corresponding center frequency.

2. The method of claim 1, further comprising determining a fill-level of a bulk material in a container based on the distance, wherein the object is the bulk material located in the container.

3. The method of claim 2, wherein the fill-level is determined in a bypass pipe or surge pipe of the container, wherein the waveguide is the bypass pipe or surge pipe.

4. A distance measurement device for FMCW-based measurement of a distance of an object located in a waveguide, the device comprising:

a high-frequency signal generator configured to generate an electrical high-frequency signal that, within a predetermined frequency band, exhibits a temporally-defined frequency modulation;

a signal splitter for splitting the electrical high-frequency signal;

at least one transmission/reception antenna for emitting the high-frequency signal as a transmission signal and/or for receiving the reception signal;

a mixer adapted to mix the electrical high-frequency signal with the obtained reception signal; and an evaluation unit configured to determine the distance using a difference frequency of an intermediate frequency signal generated by the mixer, wherein the high-frequency signal generator is configured to proportionally approximate the temporal frequency modulation of the transmission signal to a hyperbolic frequency dependency of a propagation velocity of the transmission signal in the waveguide, wherein a frequency dependency of the temporal frequency modulation is linearly approximated to the hyperbolic frequency dependency of the propagation velocity such that:

the frequency band is subdivided into at least two sub-bands of equal size;

a center frequency of each sub-band is determined; and a respective linear frequency modulation is set within each sub-band as a sub-band temporal frequency modulation, wherein the respective linear frequency modulations are set using a proportionality factor for each sub-band, the proportionality factor being proportional to the respective propagation velocity at the corresponding center frequency.

5. The device of claim 4, wherein the evaluation unit is further configured to determine a fill-level of a bulk material in a container based on the distance, wherein the object is the bulk material located in the container.

6. The device of claim 5, wherein the fill-level is determined in a bypass pipe or surge pipe of the container, wherein the waveguide is the bypass pipe or surge pipe.

7. The device of claim 6, further comprising a process connection between the device and the container or bypass pipe or surge pipe of the container.

* * * * *